(12) United States Patent
Wang

(10) Patent No.: US 12,110,103 B2
(45) Date of Patent: Oct. 8, 2024

(54) VTOL ROTORCRAFT WITH ANNULAR CONTRA-ROTATING ROTARY WINGS AND AUXILIARY PROPULSOR

(71) Applicant: Xi Wang, Saint-Laurent (CA)

(72) Inventor: Xi Wang, Saint-Laurent (CA)

( * ) Notice: Subject to any disclaimer, the term of this patent is extended or adjusted under 35 U.S.C. 154(b) by 349 days.

(21) Appl. No.: 17/515,549

(22) Filed: Nov. 1, 2021

(65) Prior Publication Data

US 2023/0140370 A1   May 4, 2023

(51) Int. Cl.
| | |
|---|---|
| *B64C 27/10* | (2023.01) |
| *B64C 9/00* | (2006.01) |
| *B64C 11/46* | (2006.01) |
| *B64C 27/20* | (2023.01) |
| *B64C 27/58* | (2006.01) |
| *B64D 27/24* | (2006.01) |
| *B64D 31/00* | (2006.01) |

(52) U.S. Cl.
CPC .............. *B64C 27/10* (2013.01); *B64C 9/00* (2013.01); *B64C 11/46* (2013.01); *B64C 27/20* (2013.01); *B64C 27/58* (2013.01); *B64D 27/24* (2013.01); *B64D 31/00* (2013.01)

(58) Field of Classification Search
CPC ......... B64C 27/10; B64C 27/20; B64C 11/48; B64C 2027/8236; B64C 2027/8227; B64U 30/24; B64U 30/26; B64U 50/14
See application file for complete search history.

(56) References Cited

U.S. PATENT DOCUMENTS

| | | | | |
|---|---|---|---|---|
| 7,802,755 B2* | 9/2010 | Poltorak | ............... | B64C 27/10 244/17.27 |
| 10,953,982 B2* | 3/2021 | Moffitt | ............... | B64C 27/82 |
| 10,967,964 B2* | 4/2021 | Kuzikov | ............... | B64U 30/24 |
| 2006/0060693 A1* | 3/2006 | Poltorak | ............... | B64C 27/32 244/17.11 |
| 2009/0129929 A1* | 5/2009 | Bahadir | ............... | B64C 27/10 416/185 |
| 2011/0147511 A1* | 6/2011 | Poltorak | ............... | B64C 27/12 244/17.11 |
| 2017/0297697 A1* | 10/2017 | Moffitt | ............... | B64C 27/32 |
| 2017/0320564 A1* | 11/2017 | Kuzikov | ............... | F03D 3/062 |
| 2017/0349273 A1* | 12/2017 | Parsons | ............... | B64C 27/82 |
| 2017/0349276 A1* | 12/2017 | Fenny | ............... | B64C 27/82 |

* cited by examiner

*Primary Examiner* — Philip J Bonzell

(57) ABSTRACT

The invention is for a VTOL (vertical take-off and landing) rotorcraft with the annular contra-rotating rotary wings and auxiliary propulsor. The rotary wing of the annular contra-rotating rotary wings is driven by a plurality of tangential forces applied at multiple locations of the inner stator hub. The annular contra-rotating rotary wings can be shrouded for the improvement of propulsive efficiency, reduction of noise and protection of the rotary wing. The fuselage is mounted along the center axis of the annular contra-rotating rotary wings to be outside of the thrust slipstream. The auxiliary propulsor includes a quad independent pusher propeller to propel the rotorcraft to reach faster forward speed.

17 Claims, 13 Drawing Sheets

VTOL ROTORCRAFT WITH ANNULAR CONTRA-ROTATING ROTARY WINGS AND AUXILIARY PROPULSOR

BACKGROUND ON THE INVENTION

The helicopter is an essential modern air transportation vehicle. Rotorcraft and rotary-wing vehicle are the technical term designated for aircraft with rotating wing, which provides lift, propulsion and steering control. Rotorcraft can land and take-off without the presence of a long runway. However, travelling in a helicopter is expensive, due to the high operational cost. Moreover, helicopter with fossil fuel engine flying over an urban area is known to be a source of noise and air pollution.

The world of aviation is under pressure to reduce emission. As a result, there are numerous new designs of E-VTOL (electrical vertical take-off and landing) rotorcraft in progress today, and the term UAM (urban air mobility) has been adopted for this type of personal or cargo aerial transportation. An E-VTOL rotorcraft is quiet, emission free and low operational cost.

As the traffic delay is increasing busy in the global urban area, an affordable E-VTOL rotorcraft is the solution for daily commuter to avoid congestion on the road. Without traffic delay, an affordable E-VTOL rotorcraft can also be used as a law enforcement vehicle, ambulance, and medical cargo transporter.

Since the weight of electrical energy storage accounts for a large fraction of the total weight of the E-VTOL rotorcraft, it is paramount to design an electrical rotorcraft with higher propulsion thrust and lift thrust efficiency. The electrical energy storage for electrical rotorcraft is not limited to electrical battery or fuel cell. Based on the momentum theory of propeller, high disc loading leads to lower lift thrust efficiency. Therefore, higher power is required to lift the aircraft and more energy is consumed to maintain airborne. The best demonstration of this theory can be found in human powered rotorcraft. The human powered rotorcraft with multiple giant rotary wings is as large as the size of a basketball court. The disc area must be very large to reduce the disc loading and increase lift thrust efficiency, therefore a person can provide the required power to hover the rotorcraft. However, long light weight blade has limited strength and is non-practical for landing on a small area. Moreover, longer blade increases of the risk of impact surrounding obstacle and human.

TECHNICAL FIELD

The disclosed invention is related to VTOL rotorcraft with auxiliary propulsor. It is also known as the compounded helicopter.

DISCLOSURE OF PRIOR ART

Traditionally, helicopter contains a single large main rotary wing for lift, propulsion, and steering control. Helicopter is distinctive by the tail rotor to balance the torque effect of the main rotary wing. A significant amount of energy is wasted in the tail rotor in hover and low-speed flight. In order to eliminate the need for the tail rotor, the contra-rotating rotary wings were introduced in helicopter design. The contra-rotating rotary wings can balance the torque effect and increase thrust without an increase in propeller frontal diameter. A lightweight civilian helicopter with large rotary wing is known to have lower disk loading, which benefits from the large disk area. As a result, the lift thrust efficiency is the highest among all the VTOL (vertical take-off and landing) vehicle. The fact that helicopter has large rotary wing with very high inertia, it is difficult to reduce or increase the rotational speed of the blade without significant lag in response time. As a result, the helicopter's rotary wing operates at constant speed, and the pitch of the blade is changed by the swash plate mechanism. The swash plate mechanism is linked to the collector and cyclic to steer the helicopter, which is a complex and heavy equipment. Naturally, both single rotor and contra-rotating rotary wings have a complex mechanical swash plate system.

The arrival of distributed electrical propulsion system allows modern multirotor to substitute the traditional helicopter. The electrical propulsion system contains multiple independent smaller rotary wings to provide lift, propulsion, and steering control. Quad-rotorcraft is a popular design for electrical rotorcraft, since it contains four moving parts, which are the four rotary wings. The fixed pitch smaller rotary wing has low inertia, which allows the speed of the rotating blade to be decreased or increased rapidly. The modulation of the power setting on the rotary wings provides lift, propulsion, and steering control. The disadvantage of the four rotary wings propulsion is that the rotary wing is smaller in diameter. Based on the momentum theory, this type of small diameter rotary wing is low in thrust lift efficient, mainly caused by the high disc loading. The multi-rotor rotorcraft is advantageous for safety redundancy, in comparing to a single rotary wing helicopter.

The primary object of the present invention is to disclose a novel VTOL rotorcraft with an efficient rotary wing propulsion system benefitting from the simplicity and safety of a multirotor rotorcraft. Moreover, an auxiliary propulsor to increase forward flight speed.

SUMMARY OF THE INVENTION

1. In one embodiment of the VTOL rotorcraft is provided, comprising of a contra-rotating rotary wings, a shroud, a fuselage, a tail boom, an auxiliary propulsor.
2. Also in one embodiment of the contra-rotating rotary wings is provided, comprising of an upper rotary wing and a lower rotary wing driven by circular linear motor.
3. In another embodiment of the contra-rotating rotary wings is provided, comprising of an upper rotary wing and a lower rotary wing driven by multiple independent motors.
4. In another embodiment of the contra-rotating rotary wings is provided, comprising of an upper rotary wing and a lower rotary wing steered by multiple independent actuators.
5. In one embodiment of the auxiliary propulsor is provided, comprising of quad independent pusher propellers, a least one directional rudder, and pitch control horizontal stabilizers.

BRIEF DESCRIPTION OF THE DRAWINGS

Regarding the invention disclosure, the feature and advantage of the invention are particularly pointed and distinctly claimed in the claims. Detailed description and methods are given to provide further comprehension of the functionality of the invention. It should be observed that three mutual orthogonal directions X, Y, and Z are shown in some of the FIGS. The first direction X is said to be "longitudinal", and the forward side is referenced to be positive. The second direction Y is said to be "transverse", and the port side is referenced to be positive. Finally, the third direction Z is said to be "vertical", and the upside is referenced to be positive. Moreover, it should be observed that force vector is shown in dash lead arrow.

DETAILED DESCRIPTION OF THE EMBODIMENTS

Figure 1:
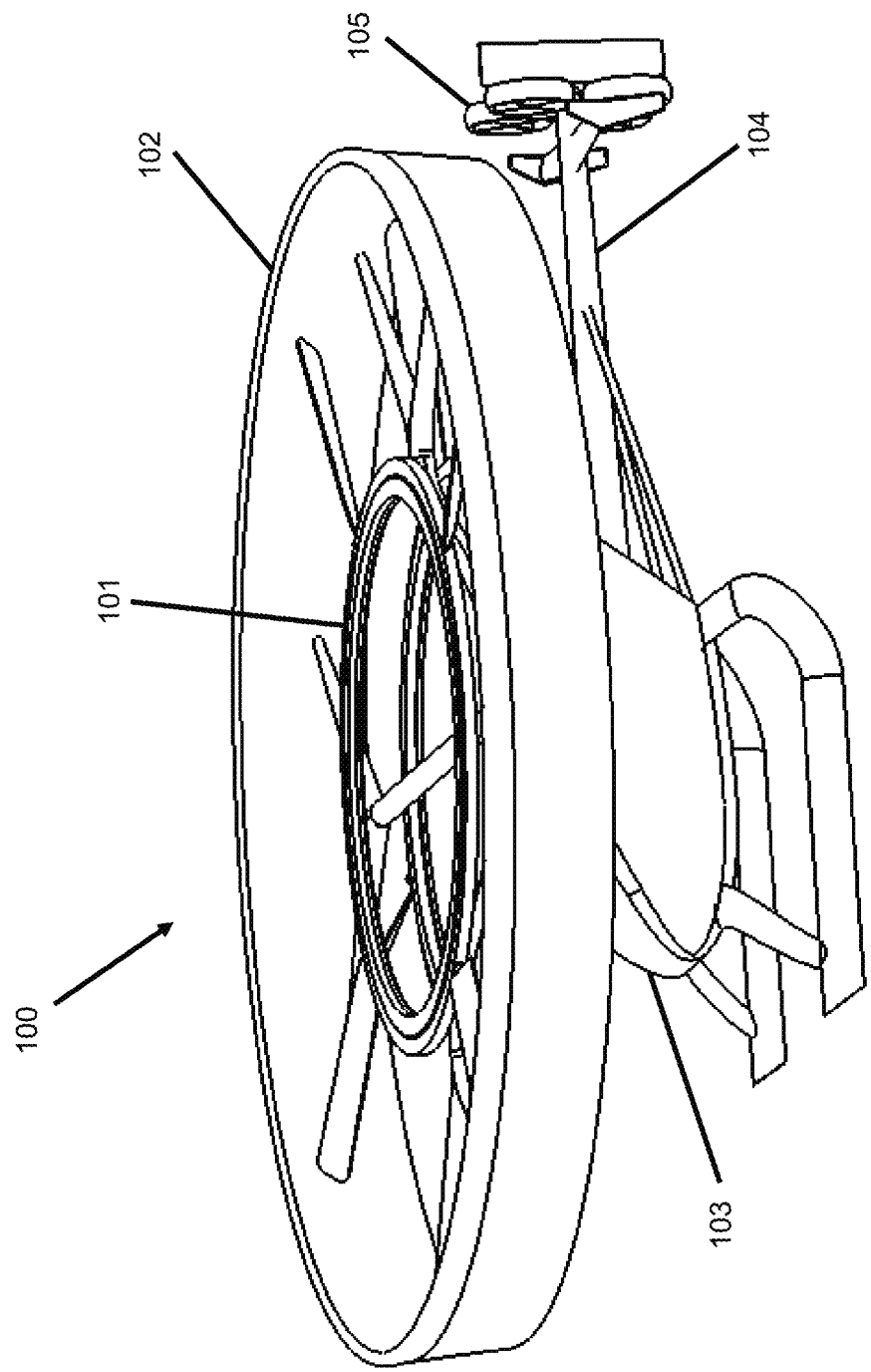
FIG. 1 is a perspective view of the embodiment of the VTOL rotorcraft with annular contra-rotating rotary wings and auxiliary propulsor.

FIG. 1 is a perspective view of the embodiment of the VTOL rotorcraft 100, which comprises of the contra-rotating rotary wings 101, a shroud 102, a fuselage 103, a tail boom 104 and an auxiliary propulsor 105. The contra-rotating rotary wings 101 and a shroud 102 are mechanically secured together. The assembly of contra-rotating rotary wings 101 and shroud 102 are mechanically linked through universal joint to the fuselage 103, therefore the assembly of contra-rotating rotary wings 101 and shroud 102 can pivot relative to the fuselage 102. The shroud 102 is wrapped around the contra-rotating rotary wings 101, it is also known as the ducted fan. The ducted fan is more efficient and saves energy due to the following two points. Firstly, the shroud helps to eliminate blade tip vortex and downstream flow contraction. Secondly, the shroud generates additional lift, due to the low-pressure airfield on the upper surface of the shroud inlet lip. Acoustic suppression is integrated in the inner surface of the shroud to reduce the noise from the contra-rotating rotary wings 101. Moreover, the shroud 102 serves as a shield to protect the contra-rotating rotary wings 101 from impacting surrounding obstacle or human. Without departing from the scope of the invention, the shroud 102 can be circle, oval, triangle or tear drop shaped outer mold line to reduce drag and generate lift during forward flight.

Figure 2:
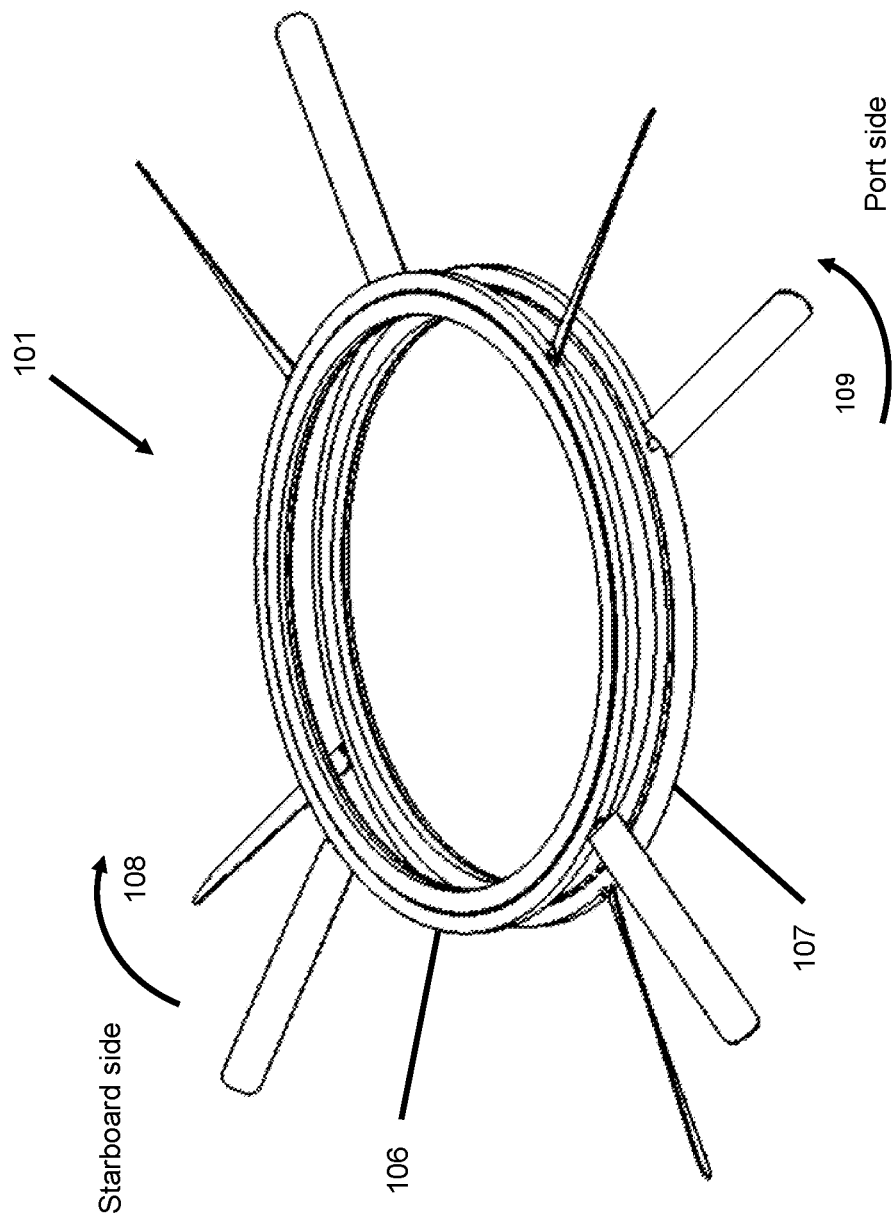
FIG. 2 is a perspective view of the embodiment of the contra-rotating rotary wings with circular linear motor.

FIG. 2 is a perspective view of the embodiment of the contra-rotating rotary wings 101, which comprises of the upper rotary wing 106 and the lower rotary wing 107. The upper rotary wing 106 and the lower rotary wing 107 share the same axis of rotation. The upper rotary wing 106 and the lower rotary wing 107 rotate in the opposing direction. As a result, the thrust produced is symmetrical. The contra-rotating rotary wings 102 can self-contain the torque effect in the yaw axis of the rotorcraft 100. Therefore, the rotorcraft 100 with contra-rotating rotary wings 102 has no need for counter yaw tail boom rotor. In the example, the rotational direction of the upper rotary wing 106 is represented by arrow 108 and the rotational direction of the lower rotary wing 107 is represented by arrow 109. For example, if the total torque applied to the upper rotary wing 106 and lower rotary wing 107 are equal, therefore the total torque effect is zero on the vertical axis. For example, if higher torque is applied to the upper rotary wing 106, and it is turning to the direction as shown by the arrow 108, which results the yaw movement on the vertical axis to the opposite direction of the arrow 108. For example, if higher torque is applied to the lower rotary wing 107, and it is turning to the direction as shown by the arrow 109, which results the yaw movement on the vertical axis to the opposite direction of the arrow 109. As a result, the rotary wings can adjust the directional heading of the rotorcraft 100 on along the rotational axis of the contra-rotating rotary wings 102.

The contra-rotating rotary wings 101 can maneuver up and down, by adjusting the speed of the contra-rotating rotary wings 102. The increase of the speed simultaneously on the upper rotary wing 106 and lower rotary wing 107 generates more thrust to move the rotorcraft 100 upward on the vertical axis. The reduction of the speed simultaneously on the upper rotary wing 106 and lower rotary wing 107 generates lesser thrust, which allows gravity to pull the rotorcraft 100 downward on the vertical axis.

Figure 3:
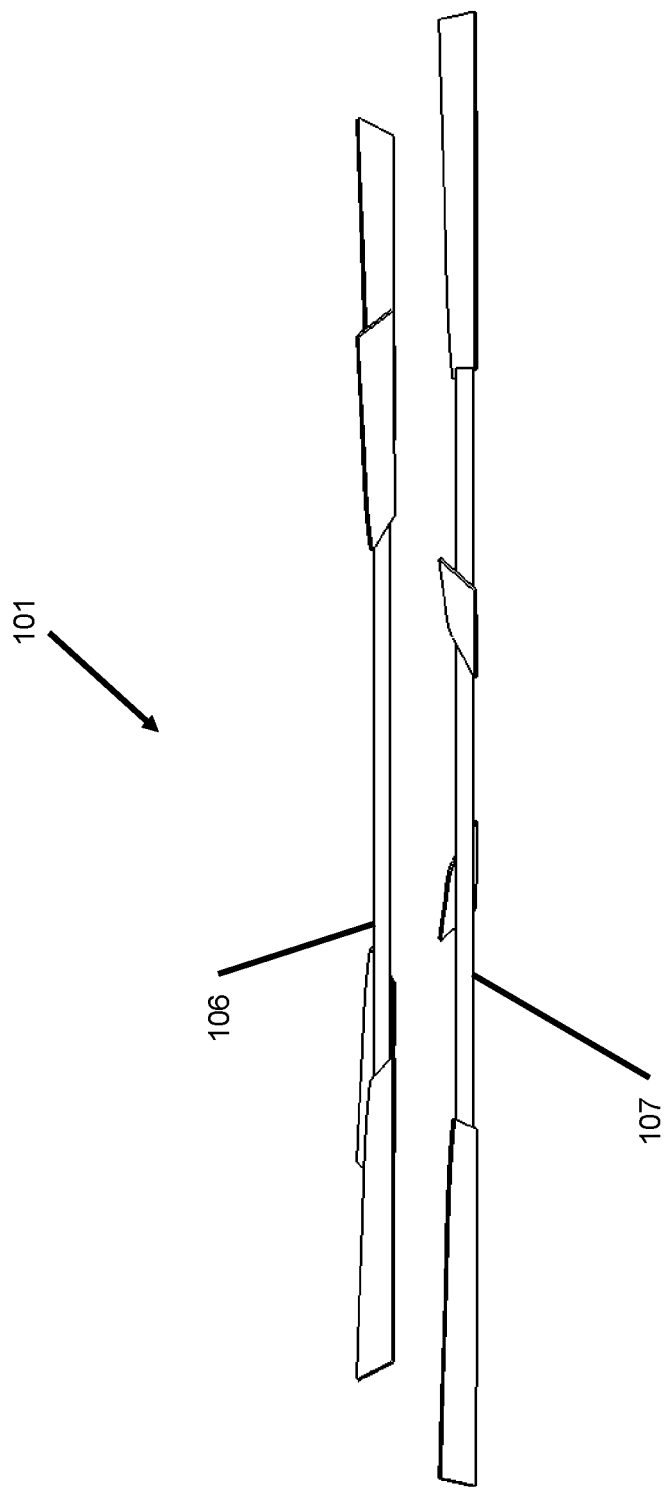
FIG. 3 is a side view of the embodiment of the contra-rotating rotary wings of FIG. 2.

FIG. 3 is a side view of the embodiment of contra-rotating rotary wings 101. The upper rotary wing 106 and lower rotary wing 107 are separated vertically.

Figure 4:
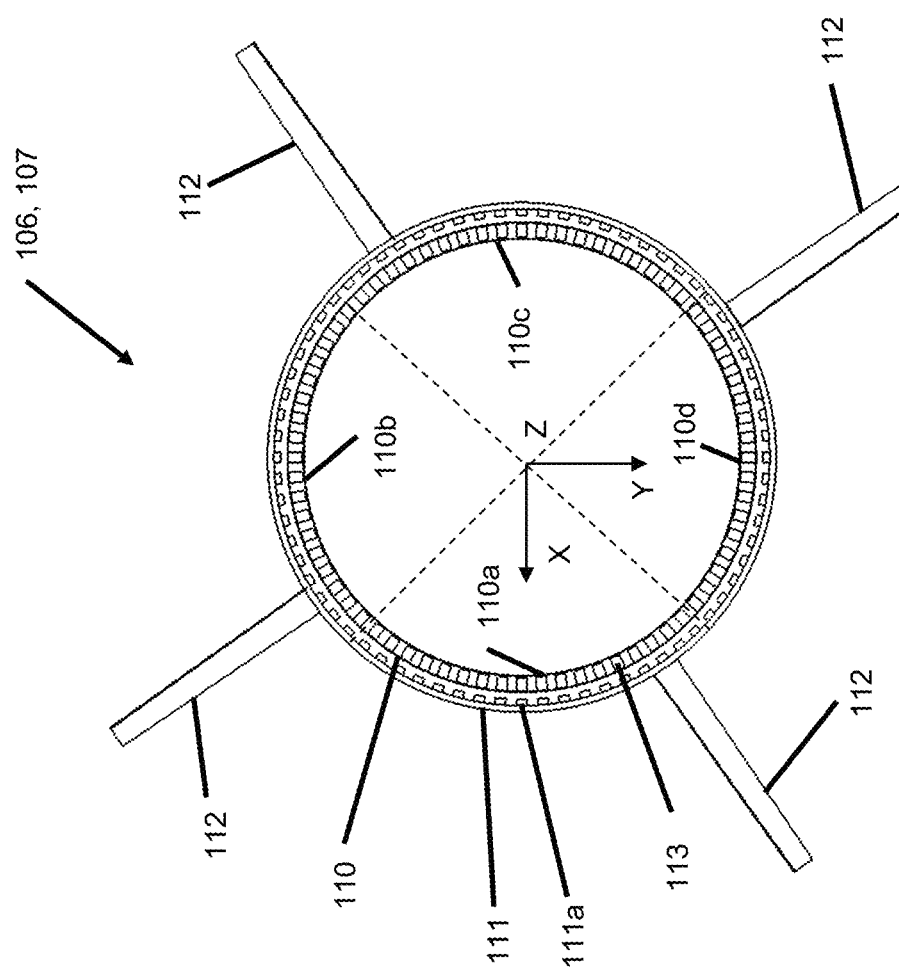
FIG. 4 is an exposed top plan view of the embodiment of FIG. 2.

FIG. 4 is a plan view of the embodiment of the upper rotary wing 106 and lower rotary wing 107. The upper rotary wing 106 and the lower rotary wing 107 have identical circular linear motor architecture, which comprises of an inner stator hub 110, an outer rotor hub 111, and a plurality of airfoils 112. The example is shown with four airfoils for illustration purpose, but it is not limited to four airfoils. The inner stator hub 110 and outer rotor hub 111 are concentric. The upper rotary wing 106 and lower rotary wing 107 are mechanically secured together through the inner stator hub 110. The circular linear motor composed of an array of stator windings 113 fixed along the circumference of the inner stator hub 110. Moreover, an array of magnet 111a mounted along the circumference of the outer rotor hub 111. This motor architecture is known as circular linear motor or direct drive motor or frameless motor. When the stator windings 113 are energized, a magnetic force is produced between the rotor magnet 111a and the stator windings 113. This magnetic force produces a tangential pulling and pushing force on the outer rotor hub 111. This tangential force is converted to torque force to turn the outer rotor hub 111. The magnetic force produces an equal reaction force acting on the inner stator hub 110. A plurality of airfoils 112 are attached to the outer rotor hub 111. When the outer rotor hub 111 is rotating, lift is generated by the plurality of airfoils 112. The slipstream thrust of the airfoils 112 is a resulting lift force. Thrust is not generated within the hollow space of the inner stator hub 110. The fuselage 103 is located along the center of the rotary wing rotational axis. Therefore, the fuselage 103 is not an obstacle of the thrust generated by the contra-rotating rotary wings 101. As a result, the contra-rotating rotary wings 101 has a higher propulsive thrust efficiency. The second factor that increases the overall propulsive lift efficiency is the large annular disc area. The momentum theory states that larger rotary wing with lower disc loading has higher lift efficiency. The design benefits from the large disc area, therefore less energy is needed to hover or maintain level flight. The airfoils 112 can be made shorter and stronger. For a constant rotational speed, it is possible to increase the lift capacity, by increasing the number of blade or employing blade of different span/chord aspect ratio. Moreover, a large diameter rotary wing provides greater authority to steer and level the rotorcraft 100.

Shown on FIG. 4, the array of stator windings 113 of the circular linear motor is divided into four partitions 110a, 110b, 110c, 110d. In other words, each partition acts as an independent circular linear motor. Each stator partition covers 90 degrees span of the inner stator hub 110. The forward direction is used as reference at degree 0. Partition 110a covers the span from 315 degree to 45 degree of the inner stator hub 110. Partition 110b covers the span from 45 degree to 135 degree of the inner stator hub 110. Partition 110c covers the span from 135 degree to 225 degree of the inner stator hub 110. Partition 110d covers the span from 225 degree to 315 degree of the inner stator hub 110. All four partitions are driving the outer rotor hub 111 to rotate at the same speed. However, the magnitude of the magnetic force of each partition is independently modulated to produce an uneven distributed tangential force. As a result, the uneven tangential forces created by partition 110a, 110b, 110c, 110d can tilt the rotational axis of the contra-rotating rotary wings 101 to steer the rotorcraft 100 in the pitch and roll axis.

Figure 5:
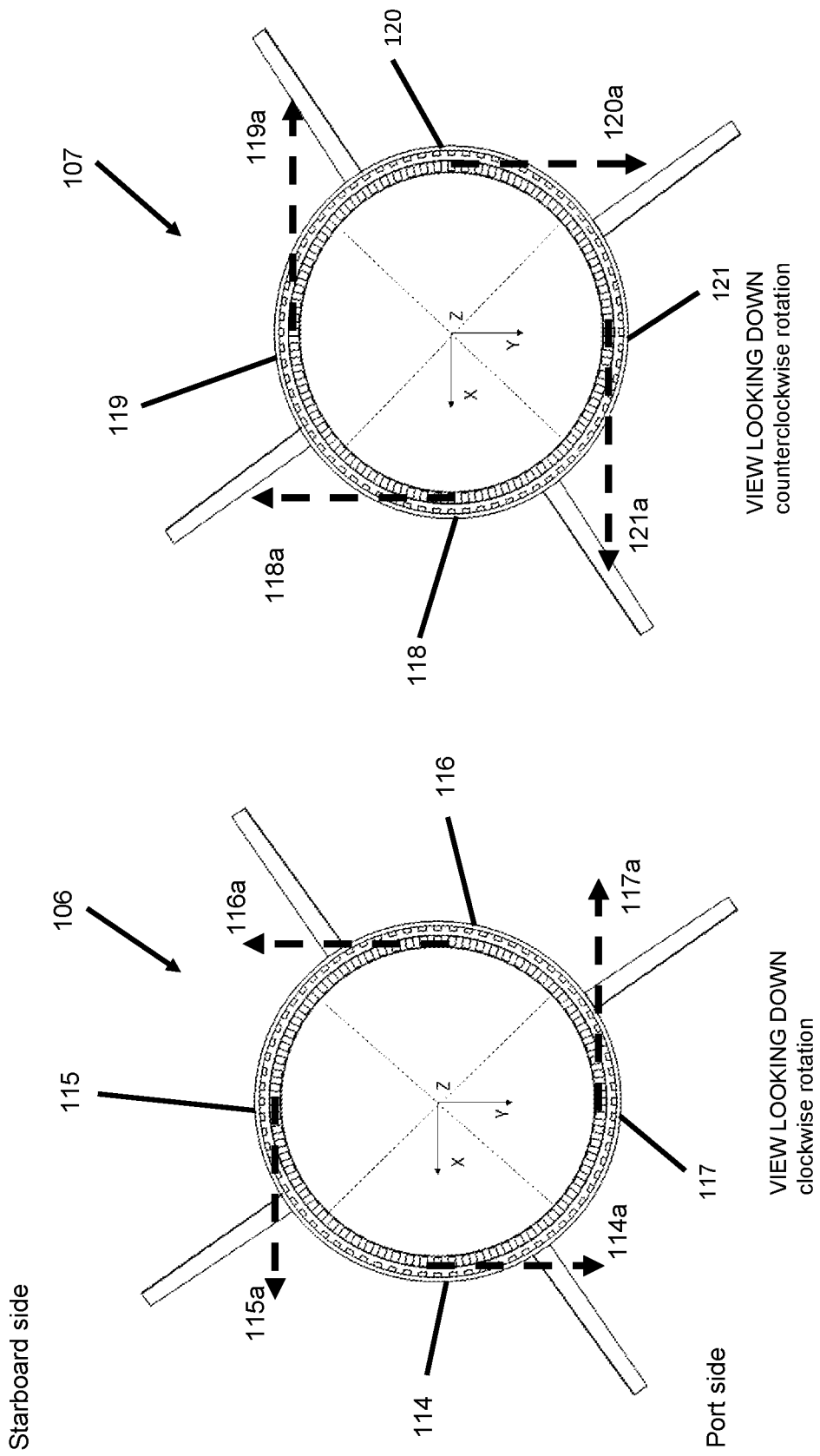
FIG. 5 is a top plan view of a diagram showing the reaction forces acting on the inner stator hub of the embodiment of FIG. 2 during vertical flight.

FIG. 5 is a schematic plan view of the resulting tangential reaction force vectors acting on the upper rotary wing 106 and lower rotary wing 107 during hover. The discrete tangential forces produced by each of the circular linear motor partitions are summed into a single tangential reaction force. The four summed reaction forces are perpendicularly acting on the stator hub 110 at location 0 degree, 90 degrees, 180 degrees, 270 degrees of the upper rotary wing 106 and lower rotary wing 107. The partition is shown as 114, 115, 116, 117 on the upper rotary wing 106. The partition is shown as 118, 119, 120, 121 on the lower rotary wing 107. The reaction force acting on the upper rotary wing 106 is represented by vector 114a, 115a, 116a, 117a. The reaction force acting on the lower rotary wing 107 is represented by vector 118a, 119a, 120a, 121a. In the case that the magnetic force is produced evenly by all four partitions of circular linear motor on the upper rotary wing 106 and lower rotary wing 107, it can be observed that all vectors have the same magnitude. Therefore, the moment couples relative to the center of gravity of the rotorcraft 100 created by vector 114a, 115a, 116a, 117a, 118a, 119a, 120a, 121a are net zero.

Figure 6:
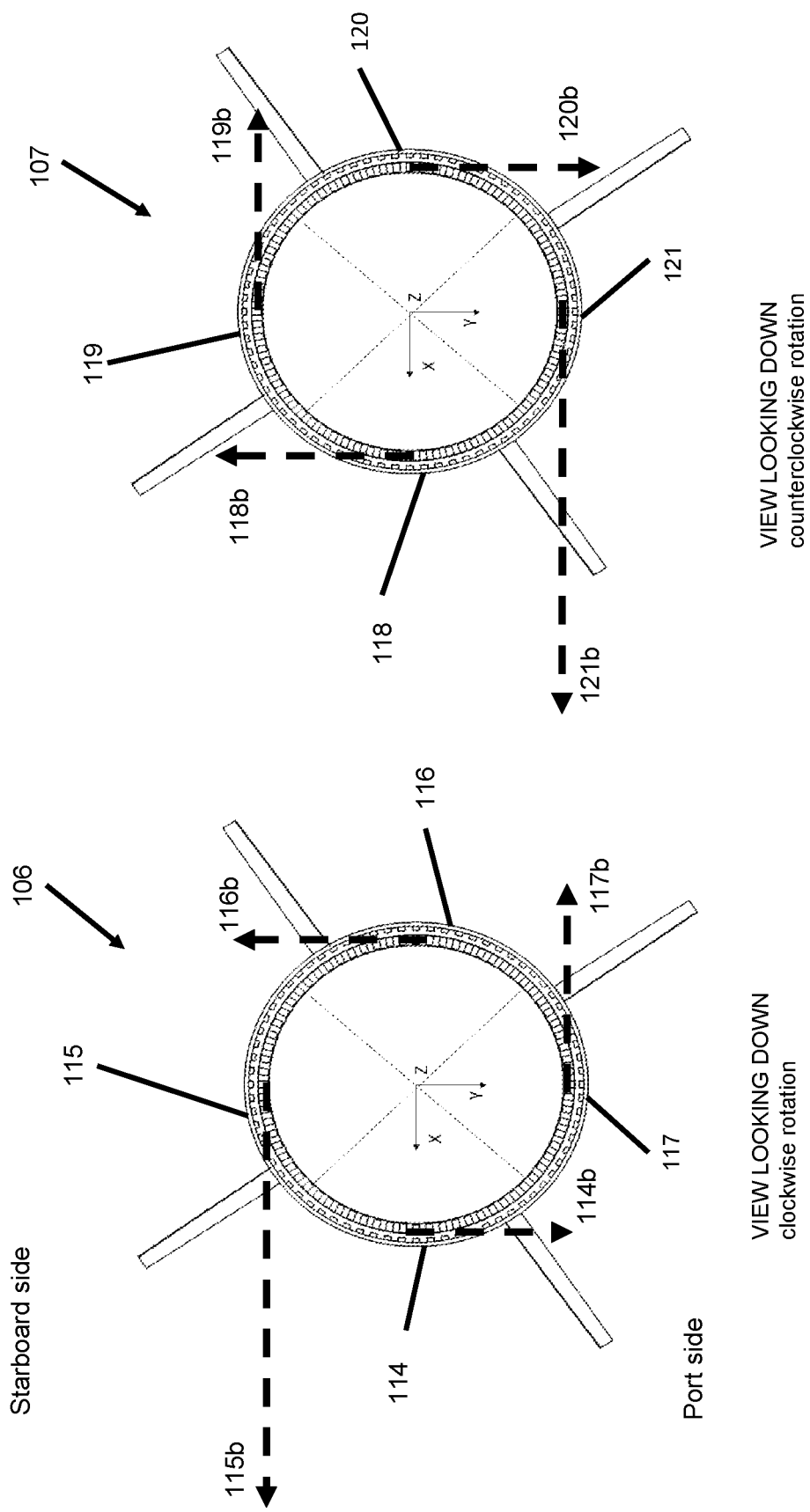
FIG. 6 is a top plan view of a diagram showing the reaction force vectors acting on the inner stator hub of the embodiment of FIG. 2 during forward fight.

FIG. 6 is a schematic plan view of a of the tangential reaction force vectors acting on the upper rotary wing 106 and lower rotary wing 107 for forward flight. The increase of magnetic force in partition 115 of the upper rotary wing 106 and partition 121 of the lower rotary wing 107, resulting the tangential reaction force vector 115b and 121b to increase in magnitude. The magnitude of tangential force of partition 114b, 116b, 117b, 118b, 119b, 120b are equal. The moment couples created by vector 114b, 116b, 117b, 118b, 119b, 120b are net zero to the rotorcraft 100. The vector 115b and 121b contribute to the net moment to steer the rotational axis of the contra-rotating rotary wings 101 to pitch forward with respect to the Y axis. The higher ratio of the vector magnitude 115b and 121b, relative to vector magnitude 114b, 116b, 117b, 118b, 119b, 120b, resulting in a higher magnitude of force for the rotorcraft 100 to pitch forward to fly faster.

Figure 7:
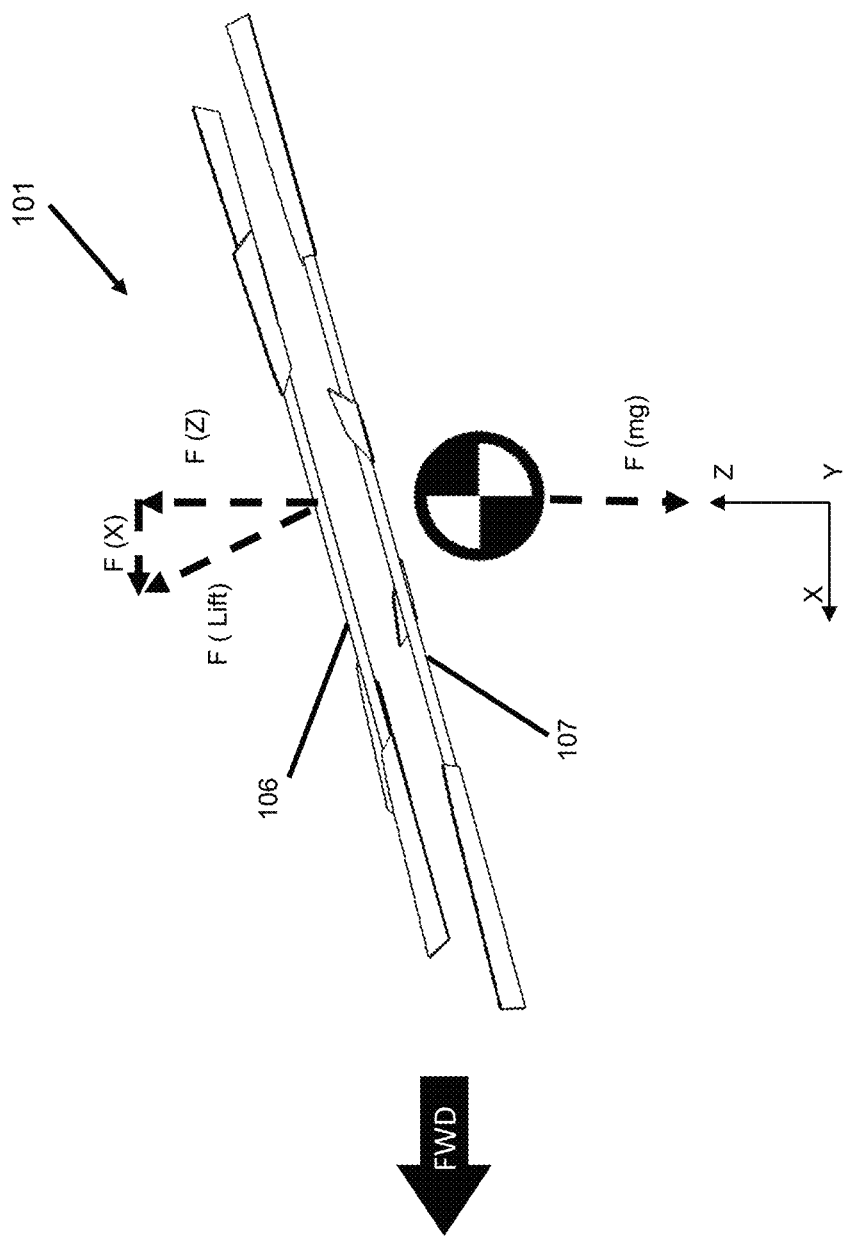
FIG. 7 is a side view of a diagram showing the force vectors of the contra-rotating rotary wings of FIG. 6 during pitch forward flight.

FIG. 7 is a side schematic view of a of the resulting forcing acting on the rotorcraft 100 in forward flight. The center of gravity of the rotorcraft 100 is represented by the center of gravity symbol. The rotorcraft 100 mass times gravity is represented by vector F(mg). The lift generated by the contra-rotating rotor wings 101 is represented by vector F(lift). The vector F(lift) is broken down to vertical vector F(Z) and horizontal vector F(X). The vector F(Z) balances with vector F(mg), and vector F(X) moves the rotorcraft forward.

Figure 8:
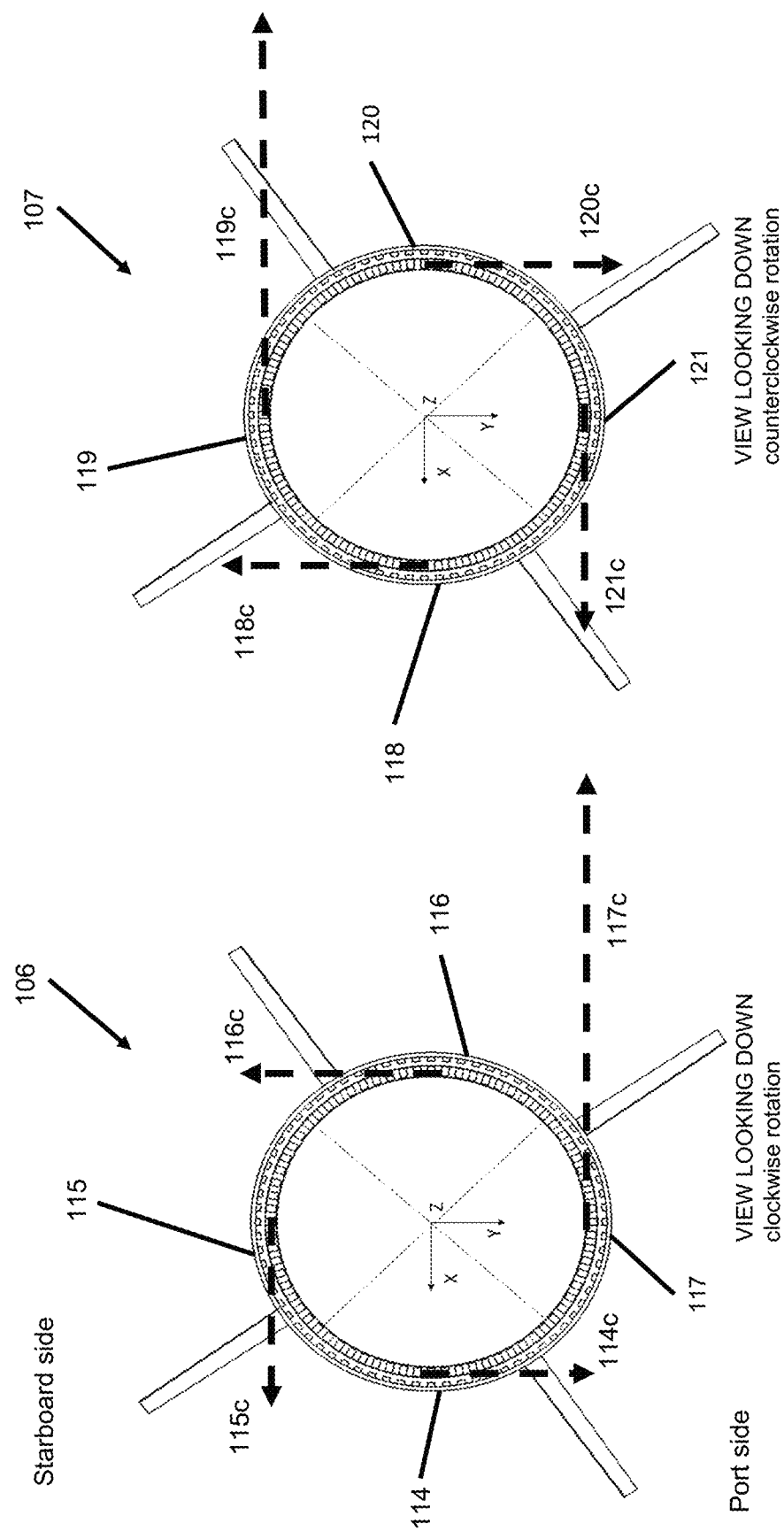
FIG. 8 is a top plan view of a diagram showing the reaction force vectors acting on the inner stator hub of the embodiment of FIG. 2 during backward flight.

FIG. 8 is a schematic plan view of a of the tangential reaction force vectors acting on the upper rotary wing 106 and lower rotary wing 107 for backward flight. The increase of magnetic force in partition 117 of the upper rotary wing 106 and partition 119 of the lower rotary wing 107, resulting in the tangential reaction force vector 117C and 119C to increase in magnitude. The moment couples created by vector 114C, 115C, 116C, 118C, 120C, 121C are net zero to the rotorcraft. The vector 117b and 119b contribute to the net moment to steer the rotational axis of the contra-rotating rotary wings 101 to pitch backward with respect to the Y axis. The higher ratio of the vector magnitude 117C and 119C, relative to vector magnitude 114C, 115C, 116C, 118C, 120C, 121C, resulting in a higher magnitude of force for the rotorcraft 100 to pitch backward to fly faster.

Figure 9:
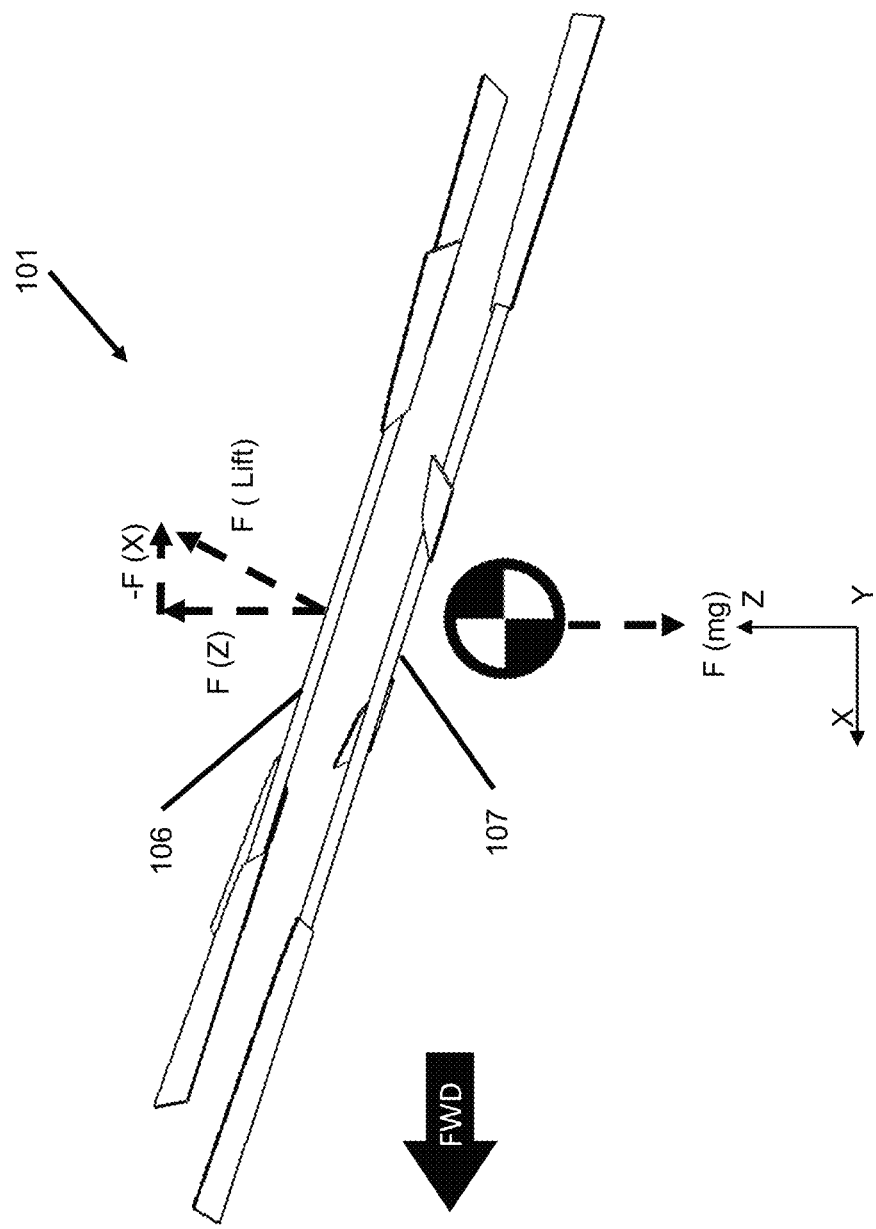
FIG. 9 is a side view of a diagram showing the force vectors of the contra-rotating rotary wings of FIG. 8 in the pitch backward flight.

FIG. 9 is a side schematic view of a of the resulting forcing acting on the rotorcraft 100 in backward flight. The center of gravity of the rotorcraft 100 is represented by the center of gravity symbol. The rotorcraft 100 mass times gravity is represented by vector F(mg). The lift generated by the contra-rotating rotor wings 101 is represented by vector F(lift). The vector F(lift) is broken down to vertical vector F(Z) and horizontal vector −F(X). The vector F(Z) balances with vector F(mg), and vector −F(X) moves the rotorcraft backward.

Referencing to back to FIG. 5. A similar method can be applied to roll the rotorcraft to the port side, by increasing the magnetic force in partition 114 of the upper rotary wing 106 and partition 120 of the lower rotary wing 107. Furthermore, a similar method can be applied to roll the rotorcraft to the starboard side, by increasing the magnetic force in partition 116 of the upper rotary wing 106 and partition 118 of the lower rotary wing 107.

Figure 10:
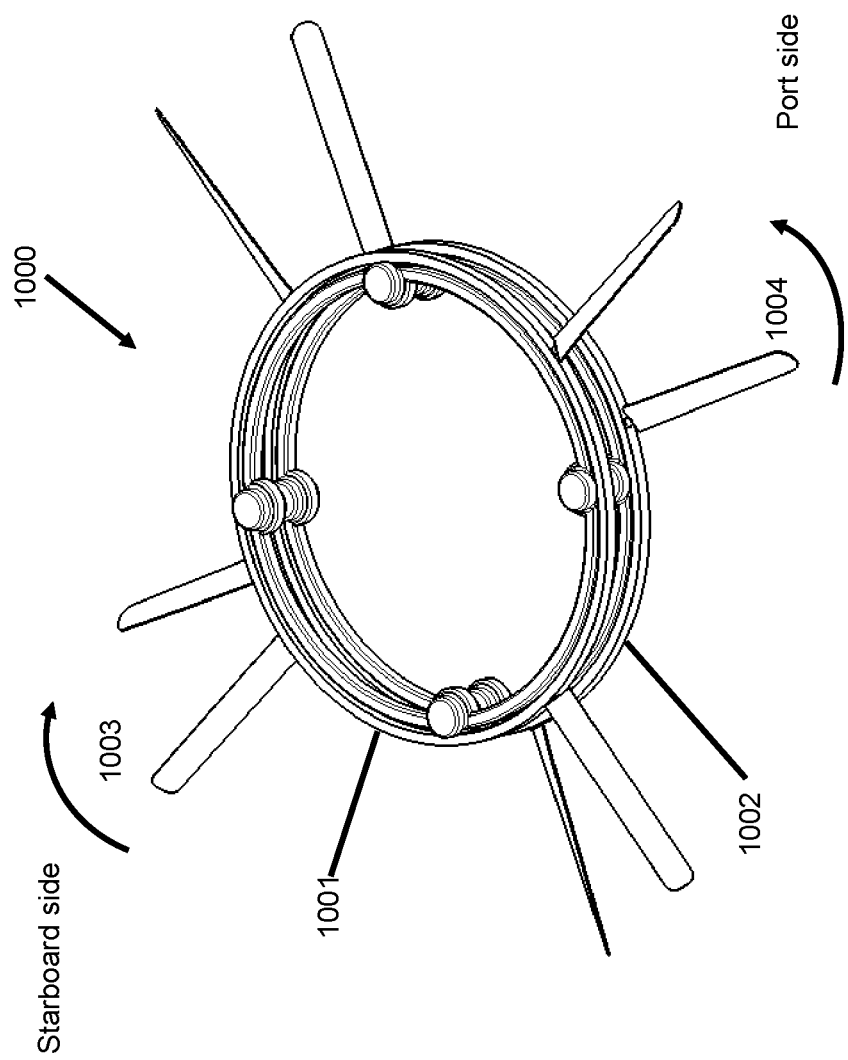
FIG. 10 is a perspective view of another embodiment of the contra-rotating rotary wings with multiple independent prime movers.

FIG. 10 is a perspective view of a second embodiment of the contra-rotating rotary wings 1000, which comprises of the upper rotary wing 1001 and the lower rotary wing 1002. The upper rotary wing 1001 and the lower rotary wing 1002 share the same axis of rotation. In the example, the rotational direction of the upper rotary wing 1001 is represented by arrow 1003 and the rotational direction of the lower rotary wing 1002 is represented by arrow 1004.

Figure 11:
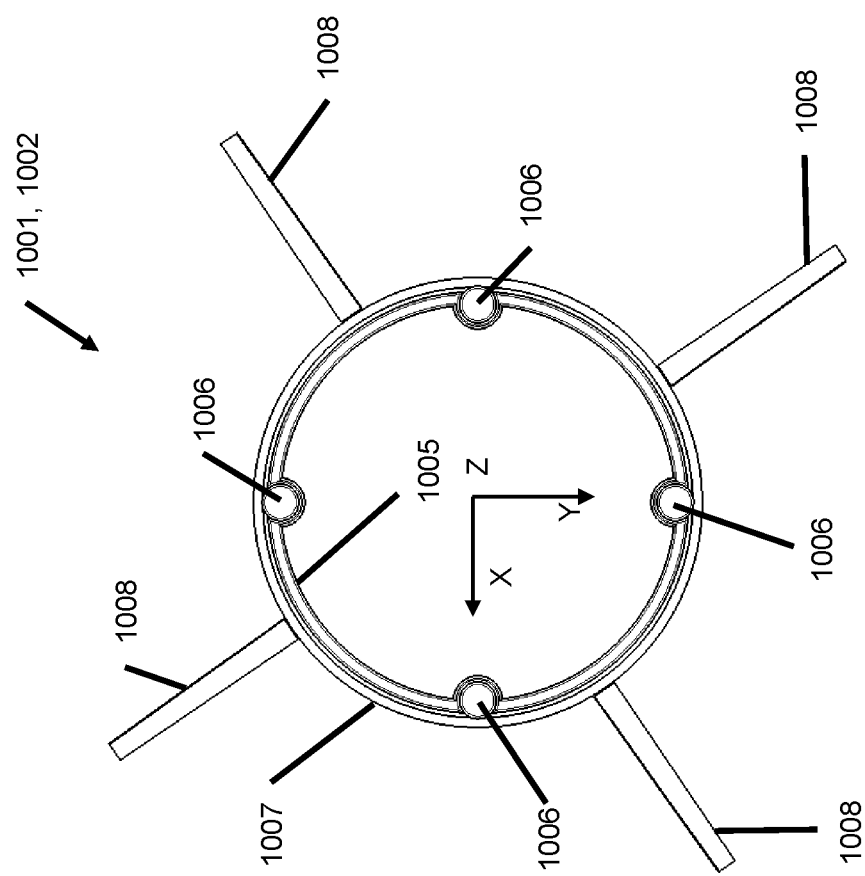
FIG. 11 is a top plan view of the embodiment of FIG. 10.

FIG. 11 is a plan view of the embodiment of the upper rotary wing 1001 and lower rotary wing 1002. The upper rotary wing 1001 and lower rotary wing 1002 have the identical multiple motor drive architecture, which comprised of a fixed inner hub 1005, a plurality of motors 1006, the outer spinner 1007, a plurality of rotary wing airfoils 1008. The example is shown with four rotary wing airfoils for illustration purpose, but it is not limited to four rotary wing airfoils. The upper rotary wing 1001 and lower rotary wing 1002 are mechanically secured together through the inner hub 1005. The plurality of motors 1006 is mounted evenly 90 degrees apart along the circumference of the inner hub 1005. In detail, two of the plurality of motors 1006 are intersecting the X-axis, and the other two of the plurality of motors 1006 are intersecting the Y-axis. The outer spinner 1007 is driven by the plurality of motors 1006, through different method of mechanical coupling, such as gear, belt, chain, viscous coupling or direct friction. The rotary output motion of the plurality of motors 1006 is converted into tangential force to rotate the outer spinner 1007. The motors 1006 is not limited to electrical motor, pneumatic driven motor, and hydraulic driven motor. Moreover, the outer spinner 1007 can be directly driven by tangential force provided by a hydraulic or pneumatic system. The contra-rotating rotary wings 1000 operates the same way as contra-rotating rotary wings 101. The uneven tangential forces created by the plurality of motors 1006 can tilt the rotational axis of the contra-rotating rotary wings 1000 to steer the rotorcraft in the pitch and roll axis.

Figure 12:
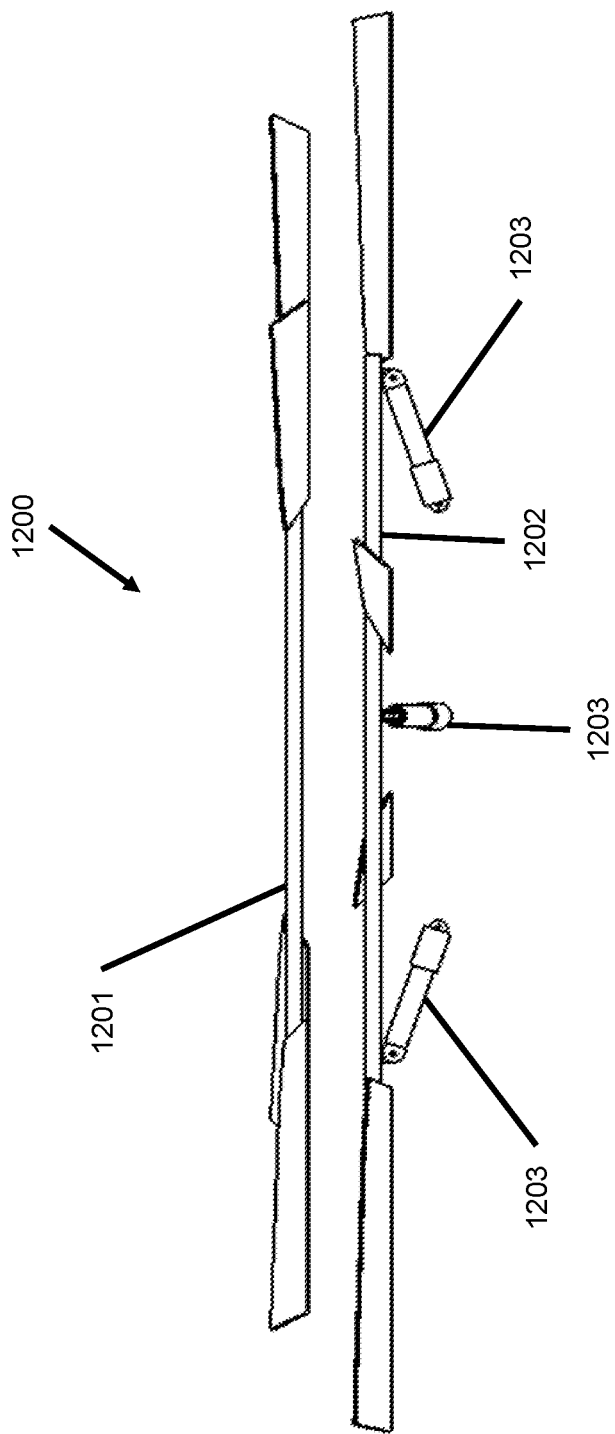
FIG. 12 is a perspective view of the embodiment of the actuated contra-rotating rotary wings.

FIG. 12 is a side view of the embodiment of the actuated contra-rotating rotary wings 1200. An actuated contra-rotating rotary wings 1200 comprising of the upper rotary wing 1201, the lower rotary wing 1202, and a plurality of linear actuators 1203. A plurality of linear actuators 1203 can also be mated with either contra-rotating rotary wings 101 or contra-rotating rotary wings 1000. The upper rotary wing 1201 and the lower rotary wing 1202 are mechanically secured together at the inner hub. The plurality of linear actuators is mechanically linking the upper rotary wing 1201 and lower rotary wing 1202 to the fuselage. The plurality of linear actuators can be electrical actuator, lever arm actuator, jackscrew actuator, hydraulic actuator, and torque motor actuator. The example is shown with four actuations for illustration purpose, but it is not limited to four actuations configuration. For example, an actuated platform with six actuations device is known as an industrial device namely Stewart Platform. The plurality of linear actuators 1203 works together to steer the rotational axis of the contra-rotating rotary wings 1200 with respect to the fuselage. As result, the change of thrust vector with respect to the fuselage permits the rotorcraft to hover, fly forward, backward and sideward.

Figure 13:
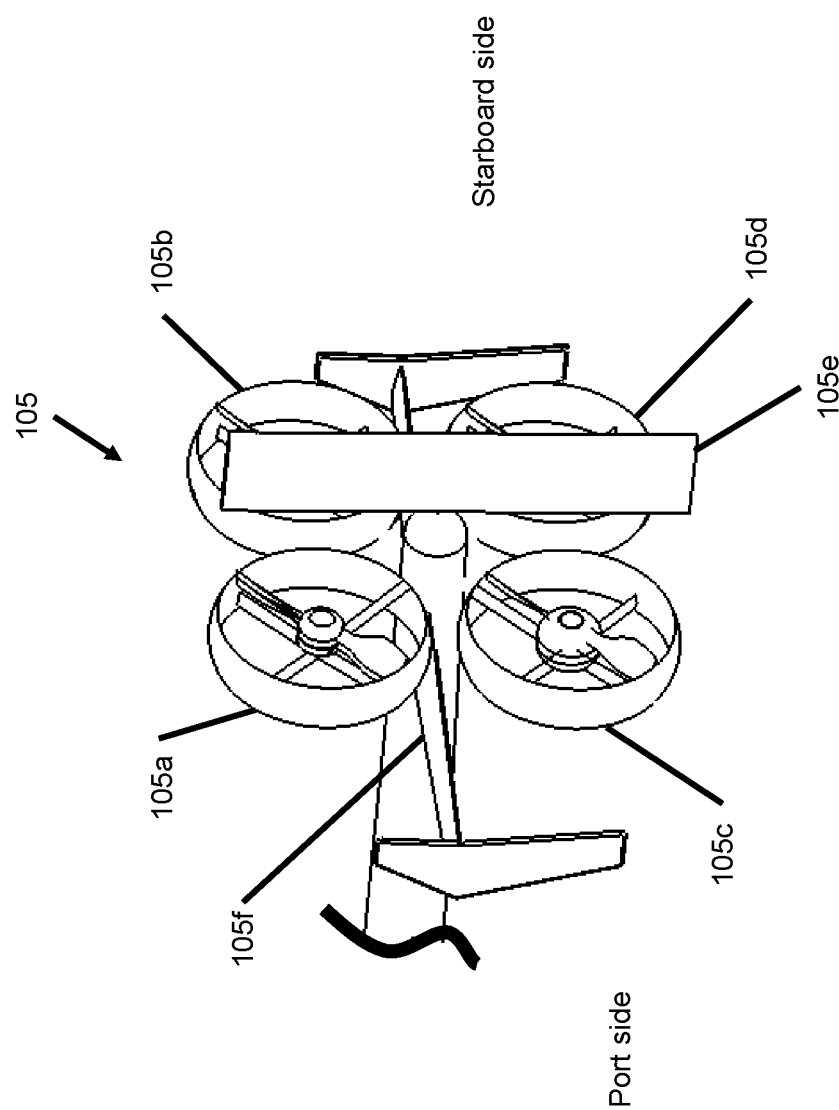
FIG. 13 is a perspective view of the embodiment of the auxiliary propulsor.

FIG. 13 is a perspective view of the embodiment of the auxiliary propulsor 105. In detail, auxiliary propulsor 105 comprises of quad ducted pusher propellers 105a, 105b, 105c and 105d driven by independent motor, at least one directional rudder 105e, and the transversally extended horizontal stabilizers 105f. The pusher propellers 105a, 105b, 105c and 105d are positioned as a 2×2 matrix. The rotational axis of the propellers is aligned with the longitudinal axis of the rotorcraft. The auxiliary propulsor 105 is mounted to the fuselage 103 through the rear tail boom 104. The propeller 105a, 105b, 105c and 105d can be ducted or unducted fan. The propeller 105a and 105d are rotating clockwise direction. The propeller 105b and 105c are rotating counterclockwise direction. The direction of rotating the propeller can also be reversed from the previously described direction. The mounting location of the auxiliary propulsor 105 is intended to clear the slipstream of the main rotary wing. The quad propellers are a redundancy feature, comparing to a single larger propeller. Naturally, the quad propellers propel the rotorcraft to achieve a faster forward speed. The directional rudder 105e can direct thrust sideward. The sideward thrust is used for directional heading control with respect to the z axis and also acts as a counter torque effect device in the event of a failure in one of the two main rotary wings. The horizontal stabilizers 105f are used for pitch control of the rotorcraft. During forward flight, the rotary wings can be unpowered in autorotation mode, and the forward thrust is provided by the pusher propellers 105a, 105b, 105c and 105d. The rotary movement of the rotary wing is resulting from the forward speed, therefore lift is generated by the rotary wing to maintain the rotorcraft airborne.

The disclosure has been described with reference to particular embodiments, it should be understood that the embodiments are for illustrative and explanatory purpose. There are numerous variations, modifications and configurations which may be made hereto without departing from the scope of the subject disclosure. In one possible configuration, the dual annular contra-rotating rotary wings can be used on a tandem rotorcraft. By definition, a tandem rotorcraft is a vehicle with a rotary wing in the front section of the fuselage and a second rotary wing in the rear section of the fuselage. The tangential forces which provide rotary movement to the rotary wing can be provided by different type of magnetic drive system, motor drive system, pneumatic drive system and hydraulic drive system. The tangential forces can also be applied at the end tip of the blade. Nevertheless, the invention is applicable to any multirotor vehicle of arbitrary weight, such as a light drone to a large tonnage vehicle.

What is claimed is:

1. A rotorcraft adapted for vertical take-off and horizontal flight, said rotorcraft comprising of:
   an annular contra-rotating rotary wings; said annular contra-rotating rotary wings comprising:
      an upper rotary wing; said upper wing comprising:
         a plurality of upper airfoils;
         an upper circular linear motor; said upper circular linear motor comprising:
            an upper inner stator hub; and
            an upper outer rotor hub; and
      a lower rotary wing; said lower wing comprising:
         a plurality of lower airfoils;
         a lower circular linear motor; said lower circular linear motor comprising:
            a lower inner stator hub; and
            a lower outer rotor hub;
   a shroud;
   a fuselage;
   a tail boom;
   a pair of horizontal stabilizers;
   a plurality of actuation devices; and
   an auxiliary propulsor; said auxiliary propulsor comprising:
      a quad pusher propellers; and
      a directional rudder.

2. The rotorcraft as set forth in claim 1, wherein said the upper rotary wing and lower rotary wing are concentric.

3. The rotorcraft as set forth in claim 1, wherein said the upper rotary wing and lower rotary wing are mechanical secured together at the inner upper stator hub and inner lower stator hub.

4. The rotorcraft as set forth in claim 1, wherein said the upper rotary wing and lower rotary wing have an annular disc area.

5. The rotorcraft as set forth in claim 1, wherein said the upper rotary wing and lower rotary wing have opposing torque effect to control the yaw directional heading of the rotorcraft.

6. The rotorcraft as set forth in claim 1, wherein said the shroud has the function to improve the propulsive efficiency of the annular contra-rotating rotary wings, to protect the annular contra-rotating rotary wings, and to reduce noise originated from the rotary motion of the annular contra-rotating rotary wings.

7. The rotorcraft as set forth in claim 1, wherein said the annular contra-rotating rotary wings are mechanical coupled to the fuselage through the plurality of actuation devices.

8. The rotorcraft as set forth in claim 1, wherein said the upper circular linear motor provide the tangential forces to rotate the upper rotary wing and the lower circular linear motor provide the tangential forces to rotate the lower rotary wing.

9. The rotorcraft as set in claim 1, wherein said the upper circular linear motor and lower circular linear motor modulate the power setting to create the tangential reaction force vector to steer the rotational axis of the rotary wing in the pitch and row axis, which permits the rotorcraft to hover, fly forward, fly backward, fly sideway.

10. The rotorcraft as set in claim 1, wherein said a plurality of actuation devices can steer the rotational axis of the annular contra-rotating rotary wings in the pitch and row axis, which permits the rotorcraft to hover, fly forward, fly backward, fly sideway.

11. The rotorcraft as set in claim 1, wherein said the auxiliary propulsor is secured to the fuselage though the tail boom.

12. The rotorcraft as set in claim 1, wherein said the auxiliary propulsor propels the rotorcraft to achieve faster forward flight.

13. The rotorcraft as set in claim 1, wherein said the auxiliary propulsor can also be used as a main propulsion during forward flight when the annular contra-rotating rotary wings are in autorotation mode.

14. The rotorcraft as set in claim 1, wherein said the directional rudder is used for yaw directional heading control of the rotorcraft.

15. The rotorcraft as set in claim 1, wherein said the directional rudder is used as a counter torque effect device.

16. The rotorcraft as set in claim 1, wherein said the horizontal stabilizers are used for pitch control of the rotorcraft during forward flight.

17. The rotorcraft as set in claim 1, wherein said the horizontal stabilizers are mechanical mounted to the tail boom.

* * * * *